(12) United States Patent
Dilger et al.

(10) Patent No.: US 7,081,039 B2
(45) Date of Patent: Jul. 25, 2006

(54) GRINDER SYSTEM AND METHOD FOR CREATING A CONTOURED CUTTING FACE WITH A VARIABLE AXIAL RAKE ANGLE

(75) Inventors: Christian Dilger, Leinfelden-Echterdingen (DE); Mikhail Simakov, Brighton (AU)

(73) Assignee: Walter Maschinenbau GmbH, Tubingen (DE)

( * ) Notice: Subject to any disclaimer, the term of this patent is extended or adjusted under 35 U.S.C. 154(b) by 18 days.

(21) Appl. No.: 11/030,186

(22) Filed: Jan. 7, 2005

(65) Prior Publication Data

US 2005/0202759 A1    Sep. 15, 2005

(30) Foreign Application Priority Data

Mar. 15, 2004   (DE) ................. 10 2004 012 742

(51) Int. Cl.
    *B24B 1/00* (2006.01)
(52) U.S. Cl. .............. 451/5; 451/8; 451/9; 451/10; 451/11; 700/159
(58) Field of Classification Search ............... 451/5, 451/8–10, 11; 408/80; 700/159, 164
    See application file for complete search history.

(56) References Cited

U.S. PATENT DOCUMENTS

| 3,279,034 | A |  | 10/1966 | Kaiser |
| 4,619,079 | A |  | 10/1986 | Kidani |
| 4,699,549 | A |  | 10/1987 | Shimomura et al. |
| 5,662,514 | A |  | 9/1997 | Masseth et al. |
| 5,844,805 | A | * | 12/1998 | Uchimura et al. ........... 700/180 |
| 6,290,571 | B1 | * | 9/2001 | Dilger et al. .................... 451/5 |
| 6,341,996 | B1 | * | 1/2002 | Brien et al. ..................... 451/8 |
| 6,453,782 | B1 | * | 9/2002 | Yamazaki et al. ............. 82/118 |
| 6,457,391 | B1 | * | 10/2002 | Yamazaki et al. ............. 82/118 |

FOREIGN PATENT DOCUMENTS

| EP | 1 348 508 | 10/2003 |
| EP | 1 389 502 | 2/2004 |
| JP | 60-044260 | 3/1985 |
| WO | WO 03/101654 | 12/2003 |

* cited by examiner

Primary Examiner—George Nguyen
(74) Attorney, Agent, or Firm—Drinker Biddle & Reath LLP

(57) ABSTRACT

Both a grinder system and a corresponding grinding method are based on a module, embodied preferably as a program or program segment, which, preferably automatically, defines the geometry of the corner cutting edge and the corner cutting face of a metal-cutting tool on the basis of predetermined peripheral conditions. The axial rake angle of the face-end cutting edge and the axial rake angle of the circumferential cutting edge as well as a desired effective profile can serve as the predetermined peripheral conditions. Further peripheral conditions may be a smooth transition of the cutting faces between the face-end chip cutting face, corner cutting face and circumferential cutting face. Tools are obtained that have a long service life and with which at the same time good machining quality can be achieved.

25 Claims, 4 Drawing Sheets

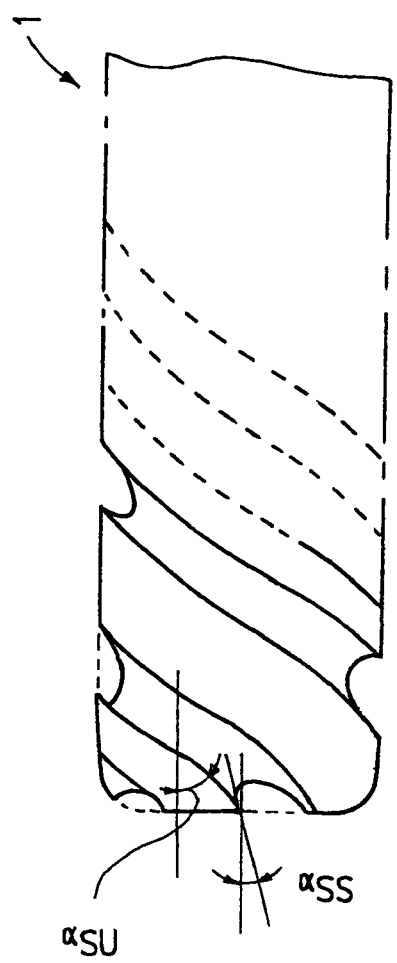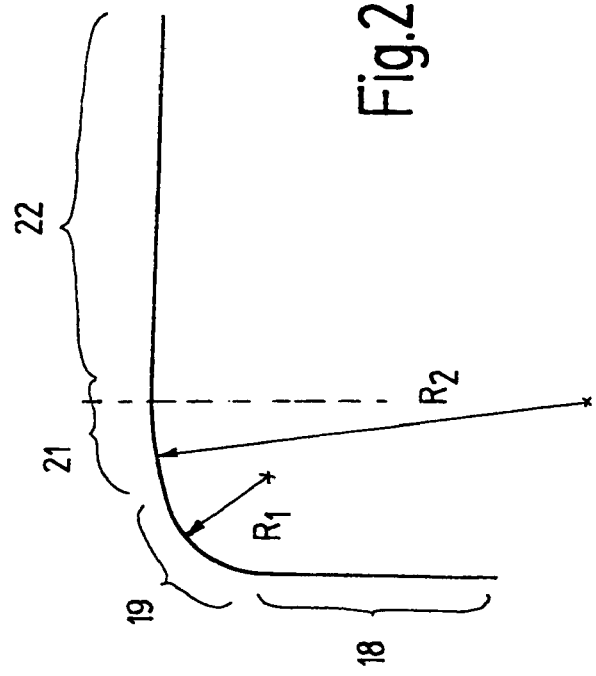

Figure 3:
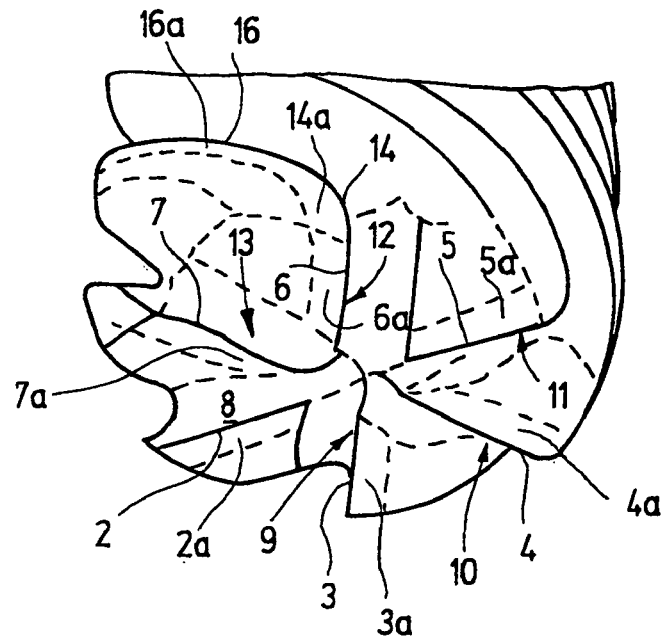

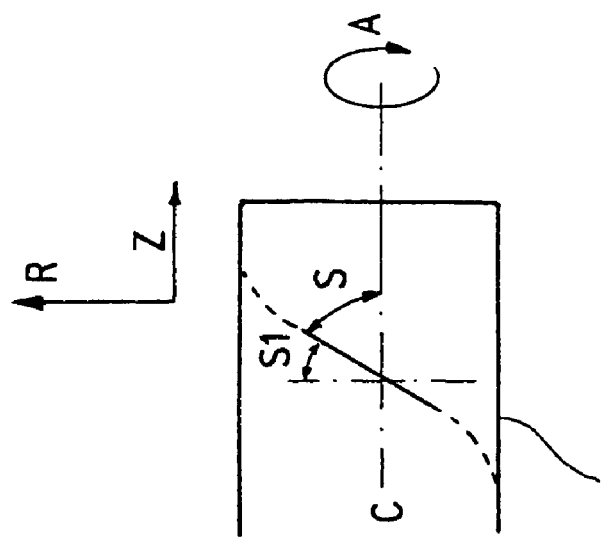
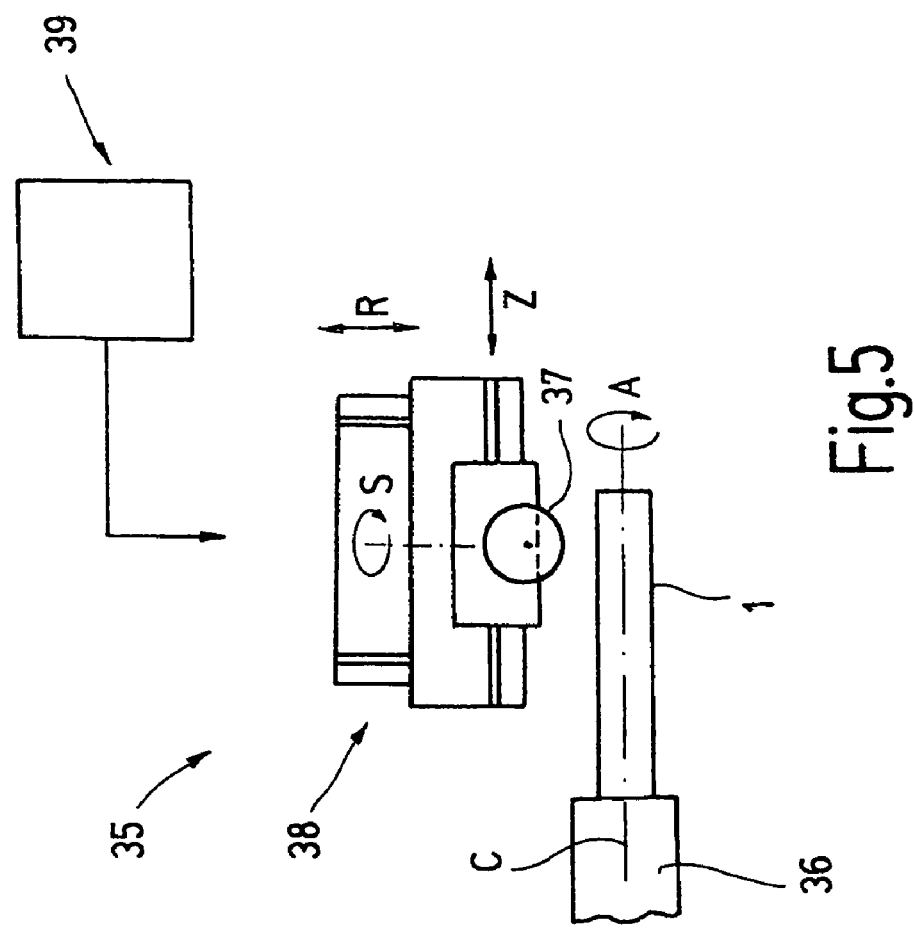

GRINDER SYSTEM AND METHOD FOR CREATING A CONTOURED CUTTING FACE WITH A VARIABLE AXIAL RAKE ANGLE

The invention relates to a grinder system, a grinding program, a data storage medium having a corresponding grinding program, and a method for creating a contoured cutting face with a variable axial rake angle.

Milling tools, which have both face-end cutting edges and corner cutting edges as well as circumferential cutting edges, are as a rule provided on the circumferential cutting edges with axial rake angles that differ from the axial rake angles of the face-end cutting edges. This is true particularly for milling tools with helical circumferential chip spaces, especially if they have a large spiral angle, that is, a small lead angle. (The spiral angle and the lead angle together add up to 90°.) If such chip spaces were continued as far as the face-end cutting edges, the result would be fragile corners that are unstable. If an axial rake angle that is between that of the face-end cutting edge and that of the circumferential edge is selected in the region of the corner cutting edge located between the face-end cutting edge and the circumferential cutting edge, then the form of the corner cutting edge is not ideal. Conversely, if the axial rake angle of the face-end cutting edge is provided in the corner region as well, then once again breakage in the region of the corner cutting edge can be the result. The breakage is due to the corner that results from the different spiral angles of the face-end chip space and the circumferential chip space.

With the above as the point of departure, it is the object of the invention to disclose a grinding method, a grinder system, and a grinding program with which improved milling tools can be created.

The chip space of the face-end cutting edge is generated by a face-end chip space module, which controls the operation of grinding the face-end chip space. Accordingly, the operation of grinding the circumferential chip space is controlled by a circumferential chip space module. According to the invention, a corner chip space module is provided, which automatically controls the generation of the circumferential chip space. The grinder system is guided along a curvilinear path in the process. This path is generated at least from predetermined peripheral conditions. Among these are for instance a predetermined effective profile of the corner cutting edge, a smooth connection, or in other words without a kink, from the corner cutting edge to the face-end cutting edge and/or the circumferential cutting edge and/or a predetermined corner axial rake angle or a predetermined course of the corner axial rake angle. In the simplest case, the course of the corner axial rake angle will be generated automatically from the axial angle of the face-end chip space and the spiral rake angle, by defining a function with which the axial rake angle (for instance with the least possible curvature of the surface generated) is carried over from the face-end chip cutting face to the circumferential cutting face. The function can be predetermined analytically or in the form of a table. In the latter case, the adaptation to concrete axial angles of the face-end chip space and axial rake angles, corner radii, and tool diameters can be done by scaling.

The grinder system of the invention, like the grinding program and the grinding method, make it possible to create metal-cutting tools with a predetermined effective profile as well as a predetermined face-end axial rake angle and circumferential axial rake angle. (These are also called the spiral angle or the circumferential axial rake angle.) This is done with simple inputs that cannot be beyond the skills of any user. The corner chip space module automatically generates a corner cutting face profile, which is flush with the adjacent chip spaces and in which the corner cutting edge matches the desired effective profile, which has an input and hence defined corner radius. The cutting faces and their transitions are smooth and without facets. The cutting edges are likewise free of kinks and corners in their entire course, from the face-end cutting edge to the circumferential cutting edge. The face-end axial rake angle and the circumferential axial rake angle can be defined independently of one another. The result is a corner cutting edge of good durability. The flow of chips is promoted by the smooth embodiment of the chip space.

Furthermore, a corresponding power grinder is simple to program, and fast machining times can be achieved. This is true in particular because the corner cutting edge, that is, the circumferential chip space, is ground in a single motion. There is no need for approaching the position multiple times from different angles, as was attempted earlier for help in this respect. In the simplest case, the face-end cutting edge, corner cutting edge and circumferential cutting edge could be ground in a single motion. Preferably, however, the face-end chip space, the circumferential chip space and the circumferential chip space are generated in separate motions of the grinding wheel, with the individual paths adjoining one another at a constant tangent. The face-end chip space, circumferential chip space and circumferential chip space are then created one after the other, using one and the same grinding tool. In this way, especially rational machining operations can be achieved.

Further details of advantageous embodiments of the invention will become apparent from the drawing, the ensuing description, or claims.

Figure 4:
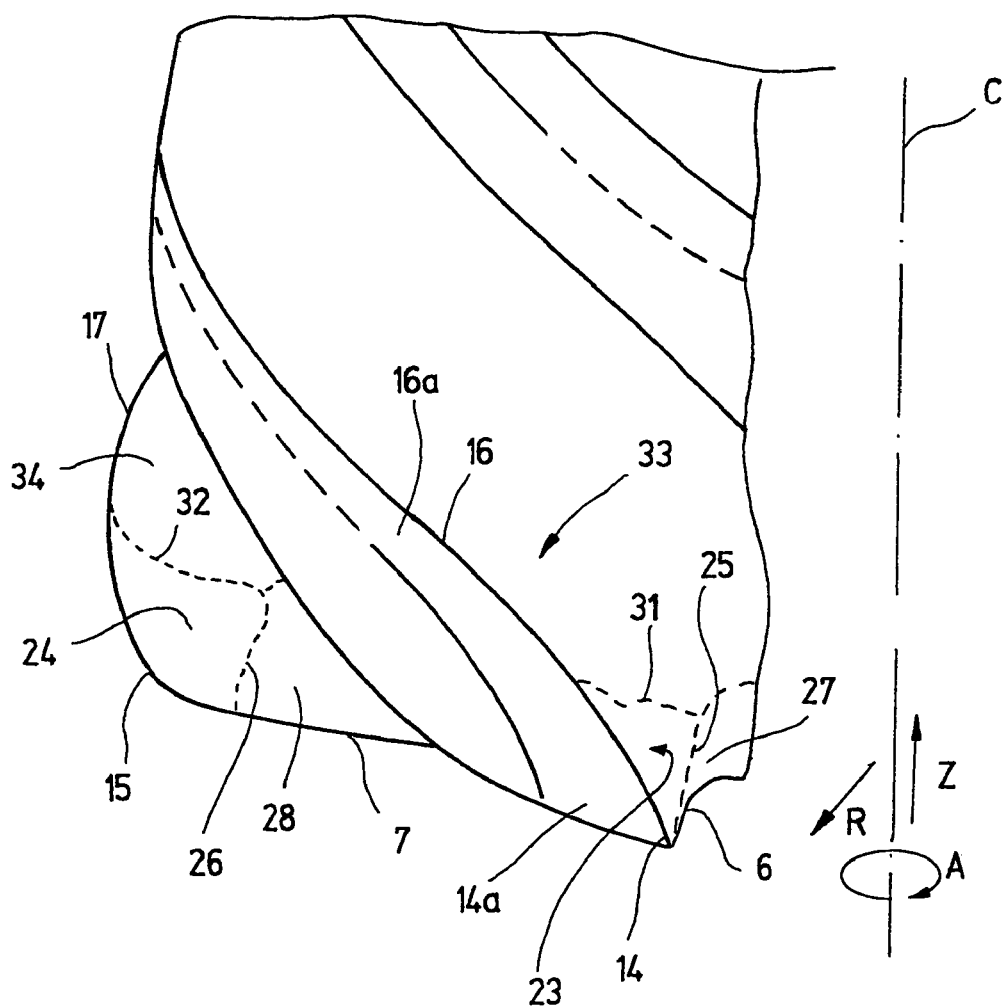
Figure 7:
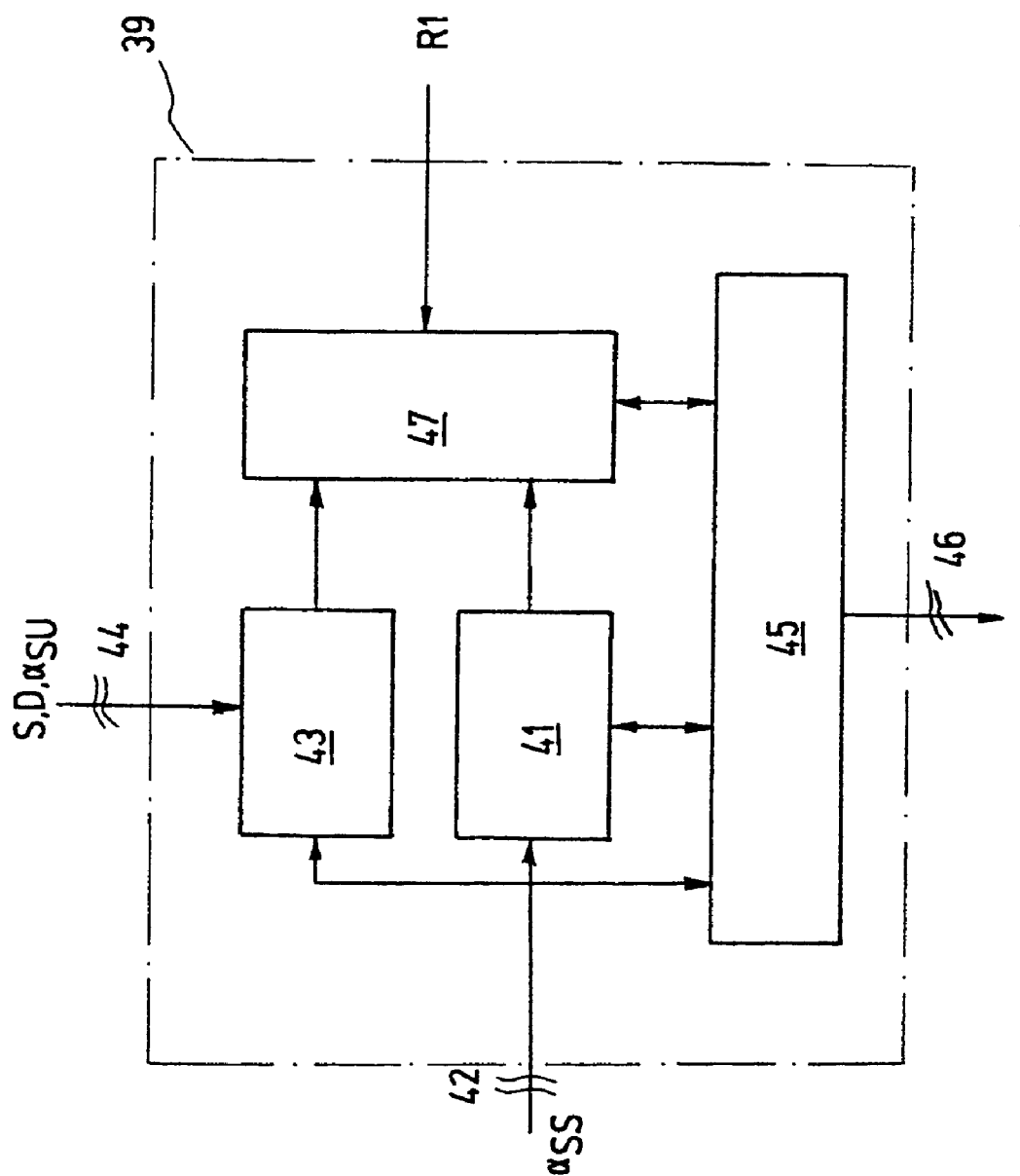

In the drawing, one example of the invention is illustrated. Shown are:

FIG. 1, a metal-cutting tool, created with the grinding method and grinder system of the invention, in a simplified, fragmentary side view;

FIG. 2, the effective profile of the metal-cutting tool of FIG. 1 in the region of its face-end cutting edge;

FIG. 3, the metal-cutting tool of FIG. 1 in a perspective view looking toward its face end;

FIG. 4, the metal-cutting tool of FIGS. 1 and 3 in a fragmentary perspective view, looking primarily in the radial direction, on a different scale;

FIG. 5, a grinder system in an extremely schematic illustration;

FIG. 6, a metal-cutting tool and its coordinates in an extremely schematic illustration; and FIG. 7, a control unit for controlling the grinder system of FIG. 5, in the form of a block circuit diagram.

In FIG. 1, a metal-cutting tool 1 is shown, in the form of a face-corner milling cutter. This metal-cutting tool is also seen in FIGS. 3 and 4. It has face-end cutting edges 2, 3, 4, 5, 6, 7, which are oriented essentially radially and are located in the same plane to which the pivot axis C (FIG. 4) is at a right angle. The face-end cutting edges 2 through 7 are adjoined by face-end chip cutting faces that define face-end chip spaces 8 through 13. At the face-end cutting edges 2 through 7, rake angles (axial rake angles $\alpha_{SS}$; see FIG. 2) are defined, which amount for instance to 5° or 10° to the axial direction. Otherwise, the face-end cutting edges 2 through 7 and the face-end chip spaces 8 through 13 may be embodied substantially identically or differently from one another. For instance, two longer end teeth and four shorter ones may be provided. The adjoining face-end cutting edges and circumferential cutting edges are also embodied identically. They will be described below as examples on the basis of the face-end cutting edges 6, 7, the adjoining corner cutting edges 14, 15, and the circumferential cutting edges 16, 17 adjoining these corner cutting edges, all of which are visible in FIG. 4.

FIG. 2 illustrates the effective profile of the metal-cutting tool 1. A first, radially extending portion 18 is generated by the face-end cutting edges 2 through 7. The effective profile then has a curved portion 19 with the radius R1, which is generated by the corner cutting edges 14, 15 as well as the other corner cutting edges, not separately identified here. Moreover, the effective profile may be provided with a portion 21 that has a greater radius R2 and is flush with the curved portion 19. The portion 21 merges with a portion 22, which is linear in FIG. 2 and thus describes a cylindrical contour. At least the portion 19 is generated by the corner cutting edges 14, 15, while the portions 21, 22 are generated by the circumferential cutting edge 16, or also by parts of the corner cutting edge 14, 15. Thus the corner cutting edge extends into the portion 21. Corner cutting edges 14, 15 may, as shown, be provided with a circular-curved effective profile or other effective profiles, such as elliptical or the like. The corner cutting edges 14, 15 border on cutting faces 23, 24, which are also called contoured cutting faces. They merge, at lines 25, 26 shown in dashed lines in FIG. 4, with the cutting faces 27, 28, which border on the face-end cutting edges 6, 7 and are therefore also called face-end chip cutting faces. The lines 25, 26, in the ideal case, do not mark any edges and in particular any shoulders. If edges are formed at the lines 25, 26, then the contoured cutting faces 23, 24 and the face-end chip cutting faces 27, 28 meet at these lines at an obtuse angle, which is for instance in the range from 160° to 180°. Thus the transition between adjacent cutting faces is essentially smooth in each case.

At lines 31, 32 shown in dashed lines in FIG. 4, the circumferential cutting edges 16, 17 border on cutting faces 33, 34, which are also called circumferential cutting faces. The lines 31, 32 once again do not represent any significant edge and in particular any shoulder. The adjacent cutting faces preferably meet at a constant tangent or at an obtuse angle which if at all possible is greater than 160°.

At the circumferential cutting edges 16, 17, the axial rake angle, corresponding to the spiral angle S visible in FIG. 6, is markedly greater than at the face-end cutting edge 6 or 7. The spiral angle S can for instance be greater than 30°. The cutting faces 23, 24 that are present in the corner regions create a transition from the small axial rake angle at the face-end cutting edges 6, 7 to the large axial rake angle at the circumferential cutting edges 16, 17. The cutting faces 23, 24 are curved or coiled in such a way that the face-end cutting edge 6 merges without kinks or shoulders with the corner cutting edge 14, which in turn merges without kinks or shoulders with the circumferential cutting edge 16. The same is true for the combination, visible in FIG. 4, of the face-end cutting edge 7, corner cutting edge 15 and circumferential cutting edge 17, as well as for all the other cutting edges. The corner cutting edge 14 or 15 thus adjoins the respective adjacent face-end cutting edge 6, 7 and the respective adjacent circumferential cutting edge 16, 17 at a constant tangent in each case. At the same time, it determines the effective profile of FIG. 2 in the portion 19, with the defined radius R. A further condition, which is advantageous in many cases and which the corner cutting edge 14 or 15 can adhere to is a minimal curvature. From these above conditions, the profile of the corner cutting edge 14 or 15 can be determined unambiguously. Thus the curvature of the profile cutting face 23, 24 is defined unambiguously as well, at least if its smooth transition to the adjacent cutting faces 27, 28 and 33, 34, respectively, is taken into account.

To produce the chip space and cutting edge geometry described thus far, a grinder system 35 shown schematically in FIG. 5 is employed. It includes a holding or chucking device 36 for receiving the metal-cutting tool 1, or its blank. Preferably, the blank or the metal-cutting tool 1 is held rotatably about an axis C. The corresponding angle of rotation is marked A. The grinder system 35 furthermore includes a grinding tool 37, for instance in the form of a grinding wheel that is driven to rotate. The corresponding grinding head is carried by a positioning device 38, with which the grinder head and with it the grinding tool 37 are supported adjustably in both the radial direction R and the longitudinal direction z and additionally pivotably about the radial direction, to make it possible to establish spiral angles S. The positioning device 38 is controlled by a control unit 39, which is indicated only schematically in FIG. 5. The control unit 39 is preferably program-controlled. Portions of the control program are schematically illustrated in FIG. 7.

The control unit 39 comprises a hardware component, for instance in the form of a computer, which communicates with suitable memories as well as an input and output device and controls the positioning device 38. FIG. 7 shows parts of the program that run on the control unit 39. This program includes a face-end chip space module 41, which contains data that characterize the shape of the face-end cutting edge (for instance, linear or curved) and of the adjoining face-end chip space. The data may be taken from a table stored in memory, or they can be input via an input interface 42. One typical input datum is the axial rake angle $\alpha_{SS}$ of the face-end cutting edge.

The control program furthermore includes a circumferential chip space module 43, which generates the control commands or signals required for grinding the circumferential chip space and the circumferential cutting edge from data that had been input or stored in memory. Typical data to be input, for instance via an input interface 44, are the spiral angle S, the diameter D, and/or the axial rake angle $\alpha_{SU}$ of the circumferential cutting edge. The modules 41, 43 furnish their data upon request to a coordination module 45, which controls the positioning device 38 directly or indirectly via an output interface 46.

The control program (the software) furthermore includes a corner chip space module 47 (also known as a profile chip space module). The software receives data from the face-end chip space module 41 and the circumferential chip space module 43. It can furthermore access a memory, not further shown, in which logical rules for designing the transition between the face-end chip space and the circumferential chip space, or typical transitions, are stored in memory in the form of tables. The corner chip space module 47, for instance, from the axial rake angle $\alpha_{SS}$ of the face-end cutting edge and the axial rake angle $\alpha_{SU}$ of the circumferential cutting edge, determines an axial rake angle course for the corner cutting edge (14 or 15 or others) and causes the corner cutting face 23, 24 defined to that extent to merge without shoulders with the adjacent cutting faces 27, 33 and 28, 34, respectively. From this, the corner chip space module ascertains control data or signals and forwards them on request to the coordination module 45.

The corner chip space module 47 ascertains the required control data for the grinder system 35, for instance in a calculation to be performed in cylinder coordinates. In the cylinder coordinates of FIG. 6, the circumferential contour of FIGS. 2 and 4 is expressed for instance by the following:

circumferential contour: R(z) (radius coordinate R over longitudinal coordinate z), and radial position: A(z) (polar angle A over longitudinal coordinate z).

The course of the polar angle is described expediently as a spiral angle S(z) as a function of the longitudinal coordinate z as follows:

[paste in, German page 11, top].

From this, for the polar angle, the equation is as follows:

[paste in, German page 11, line 5].

From this equation, the course of the cutting edge can be calculated by specification of the spiral angle and of the radius or radius course. The integration constant is selected such that the end point of the transition region (the maximum Z coordinate) of the thus-defined cutting edge is located on the surface of the circumferential chip space. A seamless transition is thus defined from the corner cutting edge to the circumferential cutting edge, as defined by the circumferential chip space. The contoured cutting face necessarily results from the motion of the grinding wheel along the thus-defined cutting edge. In the process, the grinding wheel touches the corner cutting edge on the face end. For any degrees of freedom that remain, [noun missing] are defined by indicating a core profile and a rake angle at every point of the cutting edge. However, as mentioned above and as expressed by the equation described, the definition can also be done by interpolating the gap between the face-end chip cutting face and the circumferential cutting face with a minimally curved surface.

The cutting edge is formed of the chip space surface and the tool flank. The generation described thus far of the continuous cutting edge, or in other words one without shoulders or kinks, that extends from the face-end cutting edge 6 through the corner cutting edge 14 into the circumferential cutting edge 16, makes the simple, elegant creation of tool flanks on the metal-cutting tool 1 possible, in a way similar to the method described above. The tool flanks on the face end are identified in FIG. 3 by reference numerals 2a through 7a. A corresponding corner tool flank is shown in FIG. 3 in the form of the corner tool flank 14a, as an example for the all the other corner tool flanks. The circumferential tool flank 16a shown in FIGS. 3 and 4 stands as an example of all the circumferential tool flanks. The corner tool flank 14a, belonging to the corner cutting face 23, merges without shoulders or edges with the adjacent tool flanks 6a, 16a. The circumferential tool flank is generated for instance with a rounded edge of the grinding wheel. It borders on the cutting edge and is generated with the desired clearance angle. The requisite condition for this of the continuous cutting edge course is met by the cutting edge 6, 14, 16. This is assured in particular at the transition point between the corner cutting face and the circumferential cutting face and at the transition point between the face-end chip cutting face and the corner cutting face.

The spiral angle, in the end region, or in other words the region of the face-end chip spaces 8 through 13, amounts to 10°, for instance. In the region of the corner cutting edges or the cutting faces 23, 24, it increases continuously, to a value that is slightly less than the spiral angle of the circumferential chip space. If the spiral angle in the circumferential chip space is 60°, then the spiral angle in the circumferential chip spaces increases for instance to 58°. It is attained as a result that on the one hand stability exists in the end region, and on the other, any corner whatever in the course of the cutting edge at the transition point of the two radii R1, R2 visible in FIG. 2 is prevented. At the end of the contoured cutting face (the cutting face 23), the spiral angle is therefore somewhat less than the spiral angle of the circumferential chip space, so that the contoured cutting face (or cutting face 23) does not undercut the circumferential chip space.

The course of the spiral angle as a function of the Z coordinate can be described and stored in memory for the corner cutting face 23 via tables. Alternatively or in addition, it is possible to define the rake angle of the contoured cutting face (or cutting face 23) via a function. This face can adjoin the adjacent cutting faces with minimized curvature. Additionally or alternatively, the possibility may be provided of defining the rake angle of the cutting face 23 freely. For that purpose, suitable input means, such as input masks, input tables, and the like may be provided, into which the rake angles are entered manually as a function of the Z coordinate. The input fields can be filled with proposed values by the corresponding corner chip space module.

With the grinding method and the grinder system proposed, milling tools of previously unknown quality, and with unfaceted cutting faces and/or unfaceted tool flanks particularly in the corner region, can be created. In particular, the cutting edge is free of kinks and corners from the face end to the circumference. In addition, because of the optimized corner geometry, such metal-cutting tools have good durability.

Both a grinder system and a corresponding grinding method are based on a module, embodied preferably as a program or program segment, which, preferably automatically, defines the geometry of the corner cutting edge and the corner cutting face of a metal-cutting tool on the basis of predetermined peripheral conditions. The axial rake angle of the face-end cutting edge and the axial rake angle of the circumferential cutting edge as well as a desired effective profile can serve as the predetermined peripheral conditions. Further peripheral conditions may be a smooth transition of the cutting faces between the face-end chip cutting face, corner cutting face and circumferential cutting face. Tools are obtained that have a long service life and with which at the same time good machining quality can be achieved.

The invention claimed is:

1. A grinder system for grinding metal-cutting tools, having at least one grinding tool, which is movable by means of a positioning device relative to a metal-cutting tool to be ground, acting as a workpiece, in order to form or machine cutting faces in the metal-cutting tool, having a control unit for controlling the positioning device, wherein the control unit includes:

a. a face-end chip space module, for guiding the grinding tool for machining the predetermined face-end chip space;

b. a circumferential chip space module, for guiding the grinding tool for machining the predetermined circumferential chip space; and c. a corner chip space module, which from the predetermined face-end cutting edge and the predetermined circumferential cutting edge determines a corner cutting face and for creating this face controls the positioning device accordingly by means of the grinding tool.

2. The grinder system of claim 1, characterized in that the corner cutting face is flush with the face-end chip cutting face.

3. The grinder system of claim 1, characterized in that the corner cutting face is flush with the circumferential cutting face.

4. The grinder system of claim 1, characterized in that the corner chip space module ascertains the corner cutting face from a corner cutting edge which is flush with the face-end cutting edge.

5. The grinder system of claim 1, characterized in that the corner chip space module ascertains the corner cutting face from a corner cutting edge which is flush with the circumferential cutting edge.

6. The grinder system of claim 4, characterized in that the corner chip space module determines the corner cutting edge as a minimal-curvature connecting curve between the face-end cutting edge and the circumferential cutting edge.

7. The grinder system of claim 6, characterized in that the corner chip space module, for determining the corner cutting edge, takes a predetermined effective profile of the corner cutting edge into account as an additional predetermining parameter.

8. The grinder system of claim 6, characterized in that the corner chip space module, for determining the corner cutting face, takes predetermined corner rake angles into account as additional predetermining parameters.

9. The grinder system of claim 6, characterized in that the corner chip space module generates trigger signals for the positioning device, which guides the grinding tool in the transition to the circumferential cutting face with a positive acute angle to the lead angle of the circumferential cutting face, in order to prevent the creation of an undercut.

10. An article of manufacture for grinding metal-cutting tools,
by means of at least one grinding tool, which is movable by means of a positioning device relative to a metal-cutting tool to be ground, acting as a workpiece, in order to machining chip spaces in the metal-cutting tool,
that is executable in a control unit for controlling the positioning device, wherein the grinding program includes:
a. a face-end chip space module, for guiding the grinding tool for machining the predetermined face-end chip space;
b. a circumferential chip space module, for guiding the grinding tool for machining the predetermined circumferential chip space; and
c. a corner chip space module, which from the predetermined face-end chip space and the predetermined circumferential chip space determines a corner cutting face and for creating this face controls the positioning device accordingly by means of the grinding tool.

11. An article of manufacture of claim 10, characterized in that it causes the corner cutting face to be flush with the face-end chip cutting face.

12. An article of manufacture of claim 10, characterized in that it causes the corner cutting face to be flush with the circumferential cutting face.

13. An article of manufacture of claim 10, characterized in that the corner chip space module ascertains the corner cutting face from a corner cutting edge which is flush with the face-end cutting edge.

14. An article of manufacture of claim 10, characterized in that the corner chip space module ascertains the corner cutting face from a corner cutting edge which is flush with the circumferential cutting edge.

15. An article of manufacture of claim 13, characterized in that the corner chip space module determines the corner cutting edge as a minimal- curvature connecting curve between the face-end cutting edge and the circumferential cutting edge.

16. An article of manufacture of claim 15, characterized in that the corner chip space module, for determining the corner cutting edge, takes a predetermined effective profile of the corner cutting edge into account as an additional predetermining parameter.

17. An article of manufacture of claim 15, characterized in that the corner chip space module, for determining the corner cutting face, takes predetermined corner rake angles into account as additional predetermining parameters.

18. An article of manufacture of claim 15, characterized in that the corner chip space module generates trigger signals for the positioning device, which guides the grinding tool in the transition to the circumferential cutting face with a positive acute angle to the lead angle of the circumferential cutting face, in order to prevent the creation of an undercut.

19. An article of manufacture of claim 10, characterized in that the corner chip space module is connected to an input module with which predetermining parameters (rake angles α) of the corner cutting face can be input.

20. An article of manufacture of claim 10, characterized in that the corner chip space module is connected to an input module with which predetermining parameters of the corner cutting edge can be input.

21. A method for generating or machining a chip space geometry on a metal-cutting tool by a grinding tool, wherein a positioning of the grinding tool is determined by the steps of:
a. providing first predetermined control data for generating a face-end chip cutting face on the metal-cutting tool,
b. providing second predetermined control data for generating a circumferential cutting face on the metal-cutting tool, and
c. determining from the first and second control data, third control data for generating a corner cutting face on the metal-cutting tool.

22. The method of claim 21, characterized in that for determining the shape of the corner cutting face, the point of departure is defined by the course of a corner cutting edge formed at a junction of the corner cutting face and the circumferential cutting face.

23. The method of claim 22, characterized in that the course of the corner cutting edge is determined in accordance with the specification of the effective profile $R(z)$ of the corner cutting edge and the specification of the spiral angle $S(z)$, by determining the associated polar angle $A(z)$ from them.

24. The grinder system of claim 5, characterized in that the corner chip space module determines the corner cutting edge as a minimal-curvature connecting curve between the face-end cutting edge and the circumferential cutting edge.

25. The article of manufacture of claim 14, characterized in that the corner chip space module determines the corner cutting edge as a minimal-curvature connecting curve between the face-end cutting edge and the circumferential cutting edge.

* * * * *